US006526742B1

(12) United States Patent
Ausserwoger et al.

(10) Patent No.: US 6,526,742 B1
(45) Date of Patent: Mar. 4, 2003

(54) OIL AND WATER SUPPLY SYSTEM FOR A GAS TURBINE

(75) Inventors: Gottfried Ausserwoger, Linz (AT); Alexander Hess, Linz (AT)

(73) Assignee: Linzer Elektriztäts-, Fernwärme- und Verkehrsbetriebe Aktiengesellschaft, Linz (AT); a part interest (*) Notice: Subject to any disclaimer, the term of this patent is extended or adjusted under 35 U.S.C. 154(b) by 0 days.

(21) Appl. No.: 09/701,273
(22) PCT Filed: May 27, 1999
(86) PCT No.: PCT/AT99/00134
§ 371 (c)(1),
(2), (4) Date: Feb. 26, 2001
(87) PCT Pub. No.: WO99/63209
PCT Pub. Date: Dec. 9, 1999

(30) Foreign Application Priority Data

May 29, 1998 (AT) .............................................. A 924/98

(51) Int. Cl.$^7$ ................................................ F02C 3/30
(52) U.S. Cl. ...................... 60/39.094; 60/39.55; 60/739
(58) Field of Search ..................... 60/39.094, 39.26, 60/39.3, 39.55, 39.58, 39.59, 739

(56) References Cited

U.S. PATENT DOCUMENTS

| 4,214,435 A | 7/1980 | Campbell |
| 4,259,837 A | 4/1981 | Russell et al. |
| 4,603,548 A | 8/1986 | Ishibashi et al. |
| 5,469,700 A | 11/1995 | Corbett et al. |
| 5,540,045 A | * 7/1996 | Corbett et al. ............... 60/39.3 |
| 5,617,719 A | 4/1997 | Ginter |
| 6,209,310 B1 | * 4/2001 | Kuenzi et al. ............... 60/39.3 |
| 6,250,065 B1 | * 6/2001 | Mandai et al. ............. 60/39.58 |

FOREIGN PATENT DOCUMENTS

| DE | 343 2971 | 3/1985 |
| DE | 195 48 739 | 6/1997 |
| EP | 0 517 646 | 12/1992 |
| EP | 0 590 829 | 4/1994 |

* cited by examiner

Primary Examiner—Louis J. Casaregola
(74) Attorney, Agent, or Firm—Collard & Roe, P.C.

(57) ABSTRACT

An oil supply system for a gas turbine comprises an oil feeding device, a water feeding device and a blow-off device, The oil feeding device comprises a fuel distributor connected to an oil supply line and delivering oil through primary and secondary oil conduits and to the combustion chambers of the turbine. The water feeding device comprises a water supply line connected to a distributor delivering primary and secondary water through conduits to the combustion chambers. The blow-off device comprises an air supply line split into two supply branch lines, two closed circular pipes connected to the supply branch lines by connection valves, and primary and secondary air conduits connected to the closed circular pipes for delivering air to the nozzles of the combustion chamber. To ensure a gentle oil firing operation of the gas turbine meeting the requirement of low emission values, the oil and water feeding devices comprise a secondary distributor connected to the oil and water, respectively. The distributors are arranged to deliver oil and water, respectively, at an adjustable distribution ratio. The blow-off device is equipped with proportional minimum pressure valves in the supply branch lines.

9 Claims, 3 Drawing Sheets

OIL AND WATER SUPPLY SYSTEM FOR A GAS TURBINE

CROSS REFERENCE TO RELATED APPLICATIONS

Applicants claim priority under 35 U.S.C. §119 of Austrian Application No. A924/98 filed May 29, 1998. Applicants also claim priority under 35 U.S.C. §365 of PCT/AT00/00134 filed May 27, 1999. The international application under PCT article 21(2) was not published in English.

FIELD OF THE INVENTION

The invention relates to an oil supply system for a gas turbine having a number of combustion chambers being able alternatively to be fired with gas or with oil, and equipped with primary and secondary nozzles. The system comprises an oil feeding device, a water feeding device and a blow-off device. The oil feeding device is provided with an oil supply line with a fuel distributor and a number of primary oil-conducting conduits leading from the fuel distributor to the combustion chamber to deliver oil to the primary nozzles and of secondary oil-conducting conduits running parallel to the primary oil-conducting conduits leading to the secondary nozzles. The water feeding device is provided with a water supply line and a number of primary water-conducting conduits and secondary water-conducting conduits corresponding to the number of combustion chambers and connected to the water supply line via a distributor, to deliver water to the primary and secondary nozzles. The blow-off device is provided with an air supply line split into two supply branch lines and with two closed circular pipes connected to the supply branch linen via connection valves. A number of primary air-conducting conduits and secondary air-conducting conduits corresponding to the number of gas turbine combustion chambers deliver blow-off air to the primary and secondary nozzles.

DESCRIPTION OF THE PRIOR ART

To be able to comply with the often very restrictive emission standards in case of gas turbines that can alternatively be fired with gas or oil, these gas turbines are operated according to the Dual-Fuel-Dry-Low-Nox (DLN) process, in which thermal Nox is already reduced in the combustion chamber by a better mixing of gas and air. This presupposes a multi-nozzle system of primary nozzles and secondary nozzles for each combustion chamber. In case of oil firing, the NOx reduction is achieved by the injection of water for flame cooling, with water and oil being mixed immediately upstream of the gas turbine combustion chambers or injected separately into the combustion chambers. If turbine operation is changed from oil to gas firing, each oil and water duct of each combustion chamber nozzle, air must be blown through each nozzle to remove oil residues and to provide for a continuous duct cooling. Therefore, the gas turbine requires an oil supply system for oil firing that comprises an oil feeding device, a water feeding device and a blow-off device and that, compared with gas firing, presents considerable difficulties as far as control and the distribution of fuel are concerned.

For oil supply, the burning oil delivered via an oil pump has heretofore been pumped through a fuel distributor to individual primary oil-conducting conduits leading to the gas turbine combustion chambers for the oil delivery to the primary nozzles. The primary oil-conducting conduits have been branched off the secondary oil-conducting conduits for the delivery of oil to the secondary nozzles. Secondary valves have permitted connection and disconnection of the secondary oil-conducting conduits, as the secondary nozzles are fired only after a certain firing temperature is reached. Till then, the whole fuel quantity is delivered to the primary nozzles. Afterwards, however, the fuel quantity must be distributed to the primary and secondary nozzles at a certain ratio. Due to branching the secondary oil conduits off the primary oil conduits, however, fuel distribution depends on the resistances in the supply lines and fuel dosing is uncontrolled, which time and again leads to thermal overloads and/or irregular loads of the individual gas turbine combustion chambers and/or the combustion chamber nozzles, the flame tubes, cross ignition tubes and the like, and may even cause a total wreckage of the turbine.

To reduce the NOx emissions the in oil firing operation, water must be injected at a certain quantitative proportion to oil for flame cooling, whereby thermal NOx can be reduced. To this end, deionized water is delivered to the primary and secondary nozzles by means of an appropriate jetting pump via multiple connection valves. The water injection starts only after firing temperature is reached, when the secondary nozzles are connected to the primary nozzles. Water injection is controlled via a flap valve that first reduces the pump pressure to the desired injection pressure, whereupon a control valve controlled by a water meter determines the quantity of water as a function of the oil quantity, to comply with the maximum admissible quantity ratio water/oil of, for instance, 0.85. In this case, too, there are high load variations due to the flap valve, mainly during the beginning of water injection. Because of the use of single connection valves, due to the different line resistances, there is an irregular distribution of the overall water quantity to the individual gas turbine combustion chambers with irregular loads of the combustion chambers and/or their parts.

When changing the operating mode from oil to gas firing, the oil and water ducts of the combustion nozzles must be cooled with air. Additionally, the residual oil remaining in the combustion nozzles must be blown off for cleaning and to prevent coking. Therefore, there is a blow-off device with corresponding primary and secondary air-conducting conduits. The blow-off air is tapped from the gas turbine compressor and then, by means of a separate mechanically driven air compressor, its pressure is increased, for instance, to 1.4 times the compressor pressure for blowing against the combustion chamber pressure. When changing to gas firing takes place at a firing temperature, where primary and secondary nozzles are operated, both the primary and the secondary air conducting conduits are all of a sudden connected via mere on/off valves, whereby the residual oil quantities are blown into the combustion chamber all of a sudden too. This creates a sudden increase of power, which, in turn, entails load variations affecting the service life of the turbine, endangers availability due to a turbine failure and even may lead to a shut-down of the turbine due to the over temperature in the combustion chambers.

SUMMARY OF THE INVENTION

The invention has therefore the object to provide an oil supply system of the above mentioned kind that ensures a sound oil firing operation of the gas turbine, complying with the emission standards even when the operating mode is changed, and furthermore ensures that firing of the turbine is easy on the combustion chambers and their parts.

The object of the invention is achieved according to one aspect thereof in that the oil feeding device comprises a secondary fuel distributor for the secondary oil-conducting conduits in addition to the primary fuel distributor for the primary oil-conducting conduits. The secondary fuel distributor is also connected to the oil supply line and the fuel distributors deliver quantities of oil in an adjustable distribution ratio through the oil-conducting conduits to the combustion chambers. According to another aspect, water distributors, such as variable-speed distribution pumps, with an adjustable distribution ratio are provided in the water feeding device as distributors for the primary and secondary water-conducting conduits. According to still another aspect, the blow-off device is equipped with proportional minimum pressure valves for the supply branch lines.

Due to the primary fuel distributor and the secondary fuel distributor distributing the delivered oil quantity exactly to the primary oil-conducting conduit and the secondary oil-conducting conduit according to a certain adjustable distribution ratio such as 60:40, an exact dosing of the oil quantity is ensured both for the primary nozzles and for the secondary nozzles of the combustion chambers. The fuel distributor is a positive fuel distributor such as a gear-type fuel distributor or a piston-type fuel distributor. Therefore, the fuel quantity combusted by the primary and/or secondary nozzles is exactly predetermined for each power range, thus avoiding thermal overloads of combustion nozzles, flame tubes and the like. As combustion is evened out, the service life as well as the availability of the gas turbine is increased and, last but not least, the regulation of water feeding for the necessary flame cooling and NOx reduction is facilitated.

By the application of water distributors which, again, are positive distributors, such as variable-speed distribution pumps for the primary water-conducting conduits and secondary water-conducting conduits, the water feeding device also permits an exact quantity distribution at the given distribution ratio to the primary nozzle and secondary nozzle. Additionally, the water quantity is dosed as a function of the oil quantity delivered to the combustion chambers. Moreover, a feeder pump of a lower pressure level upstream of the water distributors, such as distribution pumps, is sufficient, whereby the dosed water quantities can be increased and/or reduced gently and regularly from 0 to a maximum quantity. Thus, the gas turbine operation is evened out further, and during the whole period of oil firing the required reduction of thermal NOx is ensured, which produces a further preservation of the turbine parts and a corresponding extension of service life.

By the installation of one proportional minimum pressure valve each in the supply branch lines for the primary and secondary air-conducting conduits, the blowing-off pressure, which must be considerably higher than the combustion chamber pressure, can be increased slowly from an adjustable preliminary pressure that is equal to the combustion chamber pressure up to the final blowing-off pressure, for instance 1.4 times the combustion chamber pressure, with the time of changes being adapted to the actual conditions. Therefore, when changing the operating mode from oil firing to gas firing, the air pressure is increased all of a sudden to the adjustable preliminary pressure by means of the proportional minimum pressure valves, and then is increased steadily to the final blowing-off pressure. Thus, the residual fuel quantity is blown only slowly from the combustion nozzles into the combustion chamber, whereby an undesired increase of power is avoided. Thus, the conversion of the operating modes proceeds gently, which, in turn, extends the service life of the turbine and considerably increases its availability.

It is particularly advantageous if a switching valve is arranged in each secondary oil-conducting conduit, with a connection to the supply line to a primary oil-conducting conduit, on the one hand, and to a return line to an oil pan, on the other hand. This switching valve may be a multiple switching valve unit for all secondary oil-conducting conduits and permits the connection of the secondary oil-conducting conduits to the primary oil-conducting conduits at a firing temperature below a certain minimum temperature, so that the whole oil quantity is delivered to the primary nozzles. As soon as the minimum temperature is reached, the multiple switching valve unit opens the secondary oil-conducting conduits while simultaneously disconnecting the supply lines to the primary oil-conducting conduits, whereby the primary and secondary nozzles of all combustion chambers receive exactly the required fuel quantities at the preset distribution ratio of the primary and secondary fuel distributors. If the switching valves switch the return lines to the oil pan, the supply lines to the primary oil-conducting conduits may open into the oil pan. Thus it is prevented that, when changing the operating mode, the oil locked up in the primary and secondary conduits is pressed unchecked into the combustion chamber, whereby the CO emission of the gas flame would be extremely increased, thus endangering compliance with the emission standards.

To prevent dripping of oil and water and to interrupt it all of a sudden upon a change of the operating mode form oil to gas firing, check valves are arranged in each oil, water and air conduit to the combustion nozzles. The check valves also prevent the penetration of oil and water into the blow-off air-conducting conduits. Flat-type check valves have been used as check valves that have been screwed into each supply line immediately upstream of the combustion nozzles. To keep these valves running well, the gas turbine has had to be regularly converted to oil firing according to the operating instructions, which has brought about an accumulation of the drawbacks of a conversion of the operating mode. Moreover, the number of screwed connections have not only been complicated and time-consuming in handling but due to leaks, there has also been the danger of fire. The flat-type check valves easily coked due to their continuous contact with the water and oil and due to the high temperatures, which time and again has led to blockages of the check valves or to inadequate closing, This brought about a varying mass flow rate with the risk of burning down of the combustion nozzle flame tubes, and the unchecked input of residual oil or water into the combustion chamber endangering the emission standards. Things have been similar with primary distributor valves distributing the oil supply to the primary oil-conducting conduits leading to the primary nozzles of each combustion chamber. To avoid these drawbacks, a primary valve block with connection bores for the primary oil, water and air conduits to be connected via the check valves is arranged upstream of the primary nozzles of a combustion chamber, with air scavenging ducts connecting the air connection bores with the oil and water connection bores. Analogously, a secondary valve block with connection bores for the secondary oil, water and air conduits to be connected via the check valves is arranged upstream of the secondary nozzle of each combustion chamber, with air scavenging ducts connecting the air connection bores with the oil and water connection bores. These valve blocks make is possible that the return valves are joined to one manifold block and to use ball check valves instead of flat-type check valves. Moreover, the blow-off air is conducted from the air connection bore to the oil and water connection bores via appropriate air scavenging ducts, where it scavenges the ball check valves with blow-off air, thus preventing their coking or similar malfunction. By using scavenged and cooled ball check valves, blocking or inadequate closing of the check valves is prevented, so that the requirement for regular conversions of the operating mode to ensure proper functioning of the valves is no longer necessary. This leads to enormous cost reductions and to an increase of availability. Moreover, the valve blocks facilitate handling and installation of the valves, the danger of leaks is reduced to a minimum and the available space in the area of combustion chamber piping is extended accordingly.

As on/off valves are frequently used in the oil-conducting conduits that are triggered hydraulically via control valves, there has been the risk that, when changing the operating mode from oil firing to gas firing, the control valves, usually slide valves, that are no longer actuated get conglutinated due to the thermal load and are no longer fit for use after a reconversion of the gas turbine to oil firing. If control valves are provided for a hydraulic control of on/off valves in the oil-conducting conduit, the control valves may be periodically actuated with the control lines between the control and the on/off valves closed, to ensure controllability in spite of the risk of conglutination, so that, via a repeated actuation of the control valves, their fitness for use can be ensured. Off course, during actuation of the control valves, the control lines leading to the on/off valves must be closed to exclude switching errors.

Another improvement of the blow-off effect can be achieved by joining the oil and water connection bores to one feeding bore branching into several sub bores ending in a distribution chamber at its circumference, from where nozzle ducts lead to the primary nozzles via a distribution valve. A primary zone casing is preferably inserted in the distribution chamber. Splitting up of the feeding bores into sub bores prevents the accumulation of major residual oil quantities in lines of large cross sections. The air blown into the distribution chamber at its circumference will thus cover the whole distribution chamber and blow it clear. This is further improved by the primary zone casing on the distribution chamber, as dead space is eliminated due to the wedge-shaped cross section of the primary zone casing. This reduces residual oil quantities to a minimum. Additionally, since the valve block keeps the flow distances to the combustion nozzles as short as possible, the residual oil quantity is further reduced and blowing-off of this residual oil quantity is facilitated.

BRIEF DESCRIPTION OF THE DRAWING

The drawing depicts an example of the subject matter of the invention.

DETAILED DESCRIPTION OF THE PREFERRED EMBODIMENT

Figure 1:
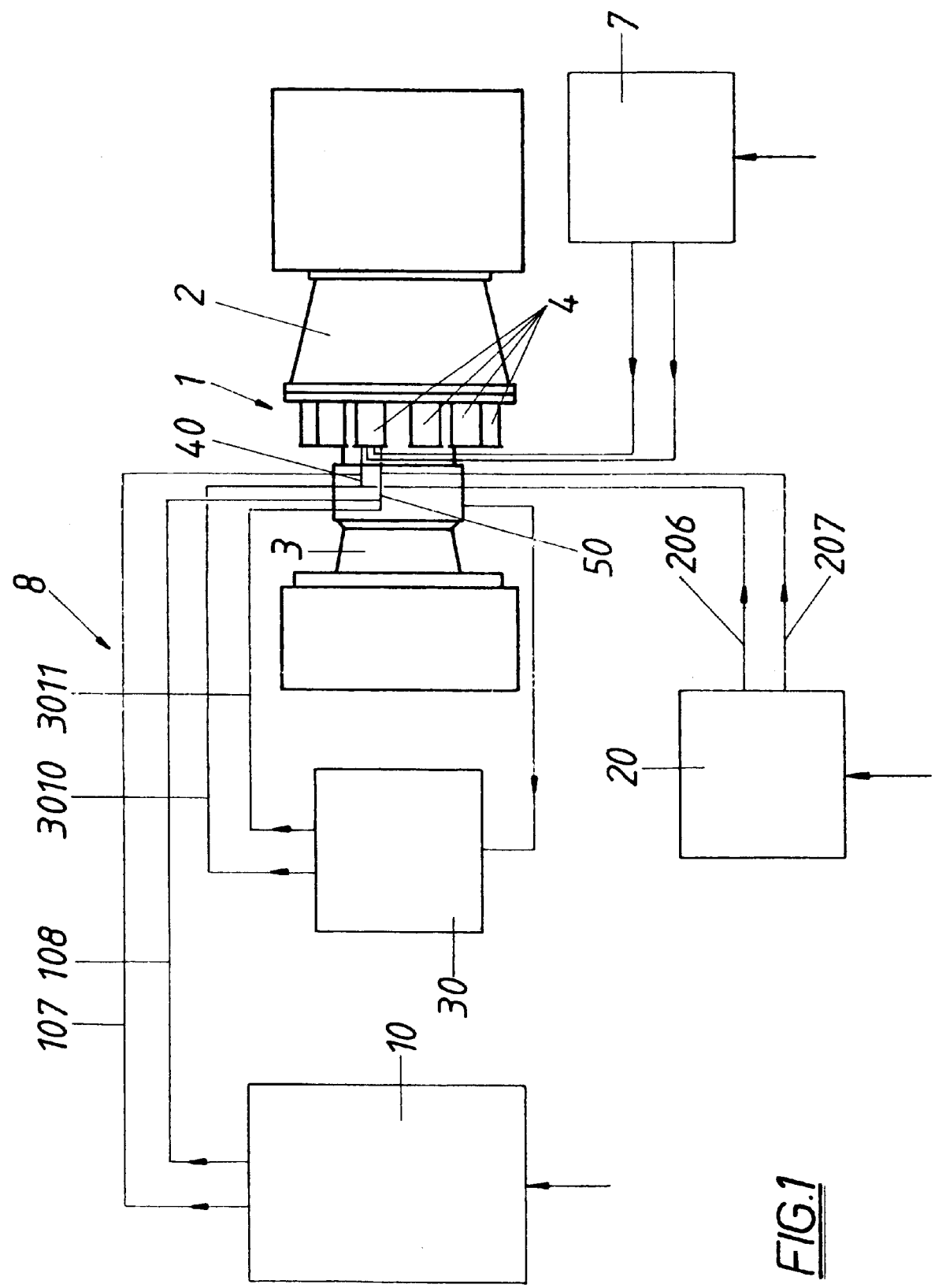
FIG. 1 is a diagrammatic overall view of an oil supply system for a gas turbine according to the invention.
Figure 2:
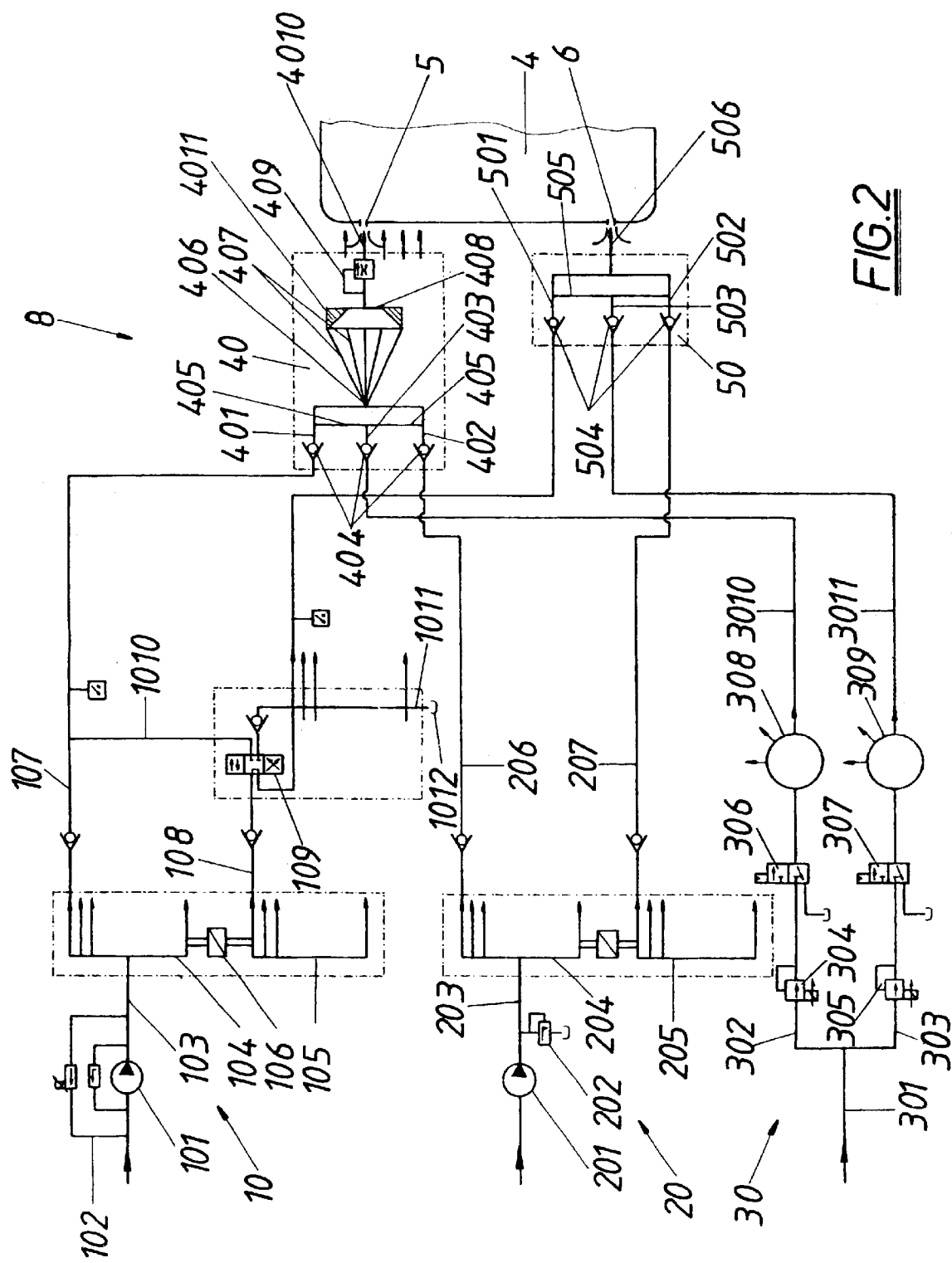
FIG. 2 is a schematic detailed view of this oil supply system on a larger scale and FIG. 3 is a block diagram illustrating the periodic actuation of a control valve for the hydraulic actuators of an on/off valve in an oil-conducting line.

A gas turbine 1 with a turbine part 2 and a compressor part 3 is equipped, for instance, with ten combustion chamber 4, each accommodating several, for instance five, primary nozzles 5 distributed over the circumference and a central secondary nozzle 6. The combustion chambers 4 can be fired alternatively with gas via a gas supply system 7 or with oil via an oil supply system 8. The oil supply system 8 comprises an oil feeding device 10, a water feeding device 20 and a blow-off device 30, which devices are provided, for each combustion chamber 4, with a primary conduit for the primary nozzles 5 and a secondary conduit for the secondary nozzles 6, of which for the sake of simplicity, only one is depicted.

The oil feeding device 10 is provided with an oil supply line 103 passing through an oil pump 101 and an oil flow regulator 102, to which oil supply line 103 a primary fuel distributor 104 and a secondary fuel distributor 105 are connected in parallel. These fuel distributors, for instance gear-type fuel distributors, are interconnected to be driven via a gear 106 to provide a certain, preferably adjustable, distribution ratio, with the fuel distributors delivering exactly apportioned oil quantities to a number of sub conduits corresponding to the number of combustion chambers, for instance ten primary oil conduits 107 and ten secondary oil conduits 108. The primary oil conduits 107 lead to a primary valve block 40 arranged upstream of the primary nozzles 5 of each combustion chamber 4 and the secondary oil conduits 108 lead to a secondary valve block arranged upstream of the secondary nozzles 6 of the combustion chamber 4. Additionally, a switching valve 109 is arranged in each secondary oil conduit 108, which valves are combined to form a multiple switching valve unit to open the secondary oil conduits 108 or, alternatively, permit their connection to a supply line 1010 to a primary oil conduit 107 or to a return line 1011 into the oil pan 1012.

The water feeding device 20 comprises a water supply line 203 passing through a feeder pump 201 and a pressure controller 202, downstream of which water supply line two water distributors 204, 205 are arranged for dividing the water supply line into a number of primary water conduits 206 and secondary water conduits 207 corresponding to the number of combustion chambers, with the water distributors 204, 205 having the same distribution ratio as the distribution ratio of primary and secondary fuel distributors 104, 105. Thus, the distribution of the water quantity to the primary and secondary water conduits is exactly the same as that of the oil quantities admitted to the primary and secondary oil conduits. The primary water conduit 206, too, end in the primary valve block 40 and the secondary water conduits 207 in the secondary valve block 50.

The blow-off device 30 is provided with an air supply line 301 receiving air from the compressor part 3 of the gas turbine 1 through an additional air compressor and an air cooler not depicted. The air supply line 301 is split into two supply branch lines 302, 303, each leading to a closed circular pipe 308, 309 via a proportional minimum pressure valve 304, 305 and a connection valve 306, 307. A number of primary air conduits 3010 corresponding to the number of combustion chambers lead from pipe 30 to primary valve block 40 and a number of secondary air conduits 3011 corresponding to the number of combustion chambers lead from pipe 309 to secondary valve block 50.

The primary valve blocks 40 are provided with connection bores 401, 402, 403 for the primary oil, water and air conduits 107, 206, 3010 and equipped with ball check valves 404 for these conduits, with air scavenging ducts 405 leading from the air connection bore 403 to the oil and water connection bores 401, 402. The oil connection bore 401 and the water connection bore 402 lead to a feeding bore 406, which branches off into several sub bores 407 leading to the circumference of distribution chamber 408. From this distribution chamber nozzle ducts 4010 lead to the primary nozzles 5 via a distribution valve 409. A primary zone casing 4011 may be inserted in distribution chamber 408.

The secondary valve block 50 is provided with connection bores 501, 502, 503 for the secondary oil, water and air conduits 108, 207, 3011 connected thereto via check valves 504, with air scavenging ducts 505 leading from the air connection bore 503 to the oil and water connection bores 501, 502. From the secondary valve block 50 a nozzle duct 506 leads to the secondary nozzle 6.

In case of oil firing of the gas turbine, the required quantity of oil is delivered via the supply line 103 at an appropriate pressure, and the primary and secondary fuel distributors 104, 105 distribute the oil to the primary and secondary oil conduits at the predetermined ratio, for instance 60:40. Up to a certain minimum firing temperature the multiple switching valve 109 is switched so that the secondary oil conduits 108 are connected to the supply line 1010. Therefore the primary and secondary oil quantities flow both through the primary oil conduit 107 to the combustion chambers. As soon as this minimum temperature is exceeded the multiple valve 109 switches over and opens the secondary oil conduit 108, so that now an appropriate portion of primary oil and secondary oil is delivered via the primary oil conduit 107 and the secondary oil conduit 108, to the primary nozzles and secondary nozzles of the combustion chambers. As soon as the secondary nozzles are connected, the water feeding device 20 is activated, so that the deionized water delivered via the feeder pump 201 at an appropriate pressure and at the appropriate quantity is distributed to the primary water conduits 206 and the secondary water conduits 207 by means of the water distributors 204, 205, and delivered to the combustion chambers as a function of the delivered oil quantity up to a ratio of 0.85. In the primary and secondary valve blocks 40, 50 of the combustion chambers the water is mixed with oil and is delivered to the primary and secondary nozzles 5, 6. This results in flame cooling and a reduction of the thermal NOx in the combustion chambers. If the mode of operation is converted from oil to gas, which may be done at optional firing temperatures, the oil and water supply is disconnected, with the switching valve 109 connecting the secondary oil conduit 108 and the supply line 1010 to the return line 1011, so that both the primary oil conduit 107 and the secondary oil conduit 108 are connected to the oil pan 1012. Simultaneous with the disconnection of oil and water supply, blow-off air is diverted from the compressor part of the turbine via the blow-off air device 30, and delivered to the air supply line 301. Thus, through the supply branch lines 302, 303, blow-off air is supplied, at a pressure reduced to that of the combustion chamber by the proportional minimum pressure valves 304, 305, via the primary and secondary air conduits 3010, 3011 to the primary and secondary nozzle blocks 40, 50, where it blows off gently the residual oil quantities in the check valve areas and in the ducts and bores of the valve blocks at a pressure increasing from the combustion chamber pressure up the higher final blow-off pressure. The combustion process converted to gas firing is thus left unaffected.

Figure 3:
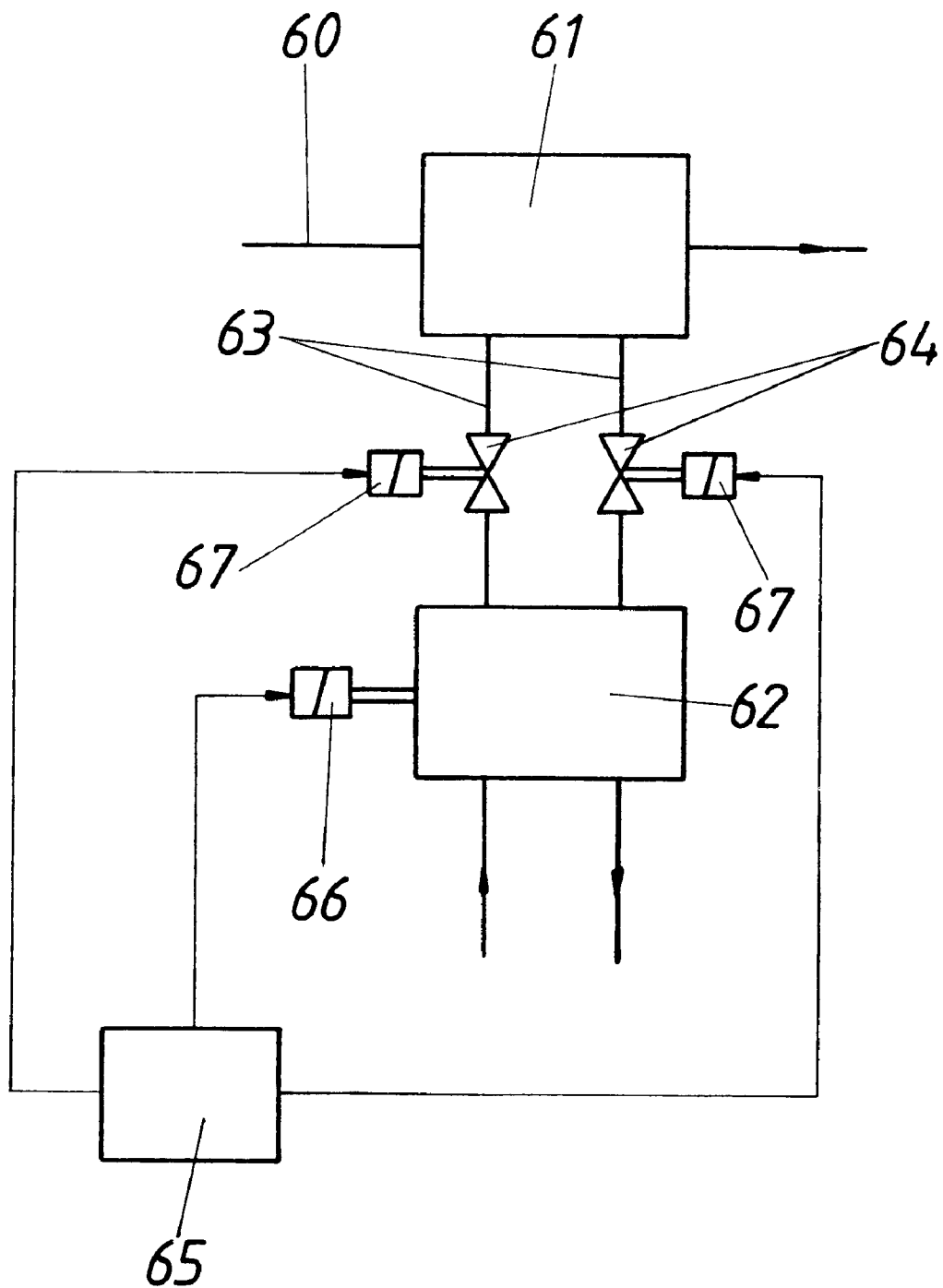

Referring to FIG. 3, in order to be able to safely trigger, via control valves 62, on/off valves 61, which are used, for instance, for flow rate regulation or other switching operations in the oil-conducting lines 60, even after a longer interruption, stop valves 64, preferably designed as shut-off ball valves, are provided between the on/off valve 61 and the control valve 62 in the hydraulic control lines 63 for feeding and discharging the oil. Thus it is possible to periodically actuate the control valve 62 via a controlling system 65 while the control lines 63 are blocked. Controlling system 65 actuates, on the one hand, the actuating drive 66 for the control valve 62 and, on the other hand, the actuating drives 67 for the stop valves 64. A periodically repeated actuation, for instance electromagnetic, of the control valve 62 via the actuating drive 66 has the effect that the control element of the control valve 62, which may, for instance, be a piston valve, is not conglutinated in the valve housing so that, after switching over to oil firing, control of the oil supply system is ensured.

What is claimed is:

1. An oil supply system for a gas turbine having a number of combustion chambers being able alternatively to be fired with gas or with oil and equipped with primary and secondary nozzles, which comprises
   (a) an oil feeding device comprising
      (1) an oil supply line,
      (2) a primary fuel distributor connected to the oil supply line and delivering quantities of oil through a number of primary oil-conducting conduits corresponding to the number of combustion chambers to the primary nozzles, and
      (3) a secondary fuel distributor connected to the oil supply line in parallel with the primary fuel distributor and delivering quantities of oil through a number of secondary oil-conducting conduits corresponding to the number of combustion chambers to the secondary nozzles,
      (4) the primary and secondary fuel distributors being arranged to deliver the quantities of oil in an adjustable distribution ratio,
   (b) a water feeding device comprising
      (1) a water supply line, and
      (2) a distributor connected to the water supply line and delivering quantities of water through a number of primary and secondary water-conducting conduits corresponding to the number of combustion chambers to the primary and secondary nozzles, and
   (c) a blow-off device comprising
      (1) an air supply line split into two branch lines connected through valves to two closed circular pipes, and
      (2) a number of primary and secondary air-conducting conduits corresponding to the number of combustion chambers delivering blow-off air to the primary and secondary nozzles.

2. The oil supply system of claim 1, wherein the oil feeding device further comprises a switching valve arranged in the secondary oil-conducting conduit, a supply line leading to the primary oil-conducting conduit and a return line leading to an oil pan being connected to the switching valve.

3. The oil supply system of claim 1, further comprising a primary valve block arranged upstream of the primary nozzles, the primary valve block having check valves and connection bores for the primary oil-conducting, water-conducting and air-conducting conduits, and air scavenging ducts between the check valves and the connection bores connecting the connection bores for the air-conducting conduits with the connection bores for the oil-conducting and water-conducting conduits.

4. The oil supply system of claim 3, wherein the connection bores for the oil-conducting and water-conducting conduits branch into several sub-bores leading to the circumference of a distribution chamber, and further comprising nozzle ducts leading to the primary nozzles from a valve interposed between the distribution chamber and the sub-bores.

5. The oil supply system of claim 1, wherein any valve in the oil-conducting conduits may be hydraulically actuatable periodically by closing control lines connecting the valve to a control valve.

6. The oil supply system of claim 1, further comprising a secondary valve block arranged upstream of the secondary nozzles, the secondary valve block having check valves connecting the secondary oil-conducting, water-conducting and air-conducting conduits to air scavenging ducts connecting the connection bores the air-conducting conduits with the connection bores for the oil-conducting and water-conducting conduits.

7. An oil supply system for a gas turbine having a number of combustion chambers being able alternatively to be fired with gas or with oil and equipped with primary and secondary nozzles, which comprises
- (a) an oil feeding device comprising
  - (1) an oil supply line, and
  - (2) a fuel distributor connected to the oil supply line and delivering quantities of oil through a number of primary and secondary oil-conducting conduits corresponding to the number of combustion chambers to the primary and secondary nozzles,
- (b) a water feeding device comprising
  - (1) a water supply line, and
  - (2) distributors connected to the water supply line and being arranged to deliver quantities of water in an adjustable distribution ratio through a number of primary and secondary water-conducting conduits corresponding to the number of combustion chambers to the primary and secondary nozzles, and
- (c) a blow-off device comprising
  - (1) an air supply line split into two branch lines connected through valves to two closed circular pipes, and
  - (2) a number of primary and secondary air-conducting conduits corresponding to the number of combustion chambers delivering blow-off air to the primary and secondary nozzles.

8. The oil supply system of claim 7, wherein the distributors are variable-speed distribution pumps.

9. An oil supply system for a gas turbine having a number of combustion chambers being able alternatively to be fired with gas or with oil and equipped with primary and secondary nozzles, which comprises
- (a) an oil feeding device comprising
  - (1) an oil supply line, and
  - (2) a fuel distributor connected to the oil supply line and delivering quantities of oil through a number of primary and secondary oil-conducting conduits corresponding to the number of combustion chambers to the primary and secondary nozzles,
- (b) a water feeding device comprising
  - (1) a water supply line, and
  - (2) a distributor connected to the water supply line and delivering quantities of water through a number of primary and secondary water-conducting conduits corresponding to the number of combustion chambers to the primary and secondary nozzles, and
- (c) a blow-off device comprising
  - (1) an air supply line split into two branch lines connected through valves to two closed circular pipes, the valves including proportional minimum pressure valves, and
  - (2) a number of primary and secondary air-conducting conduits corresponding to the number of combustion chambers delivering blow-off air to the primary and secondary nozzles.

* * * * *